Nov. 4, 1969    H. BINDER ET AL    3,475,971

COMBINATION TWO-AXIS ELECTROMAGNETIC TORQUE AND PICKOFF

Filed April 28, 1967    2 Sheets-Sheet 1

INVENTORS
HERBERT BINDER
ROBERT V. DELANEY
BY
Karl A. Ohralik
ATTORNEY

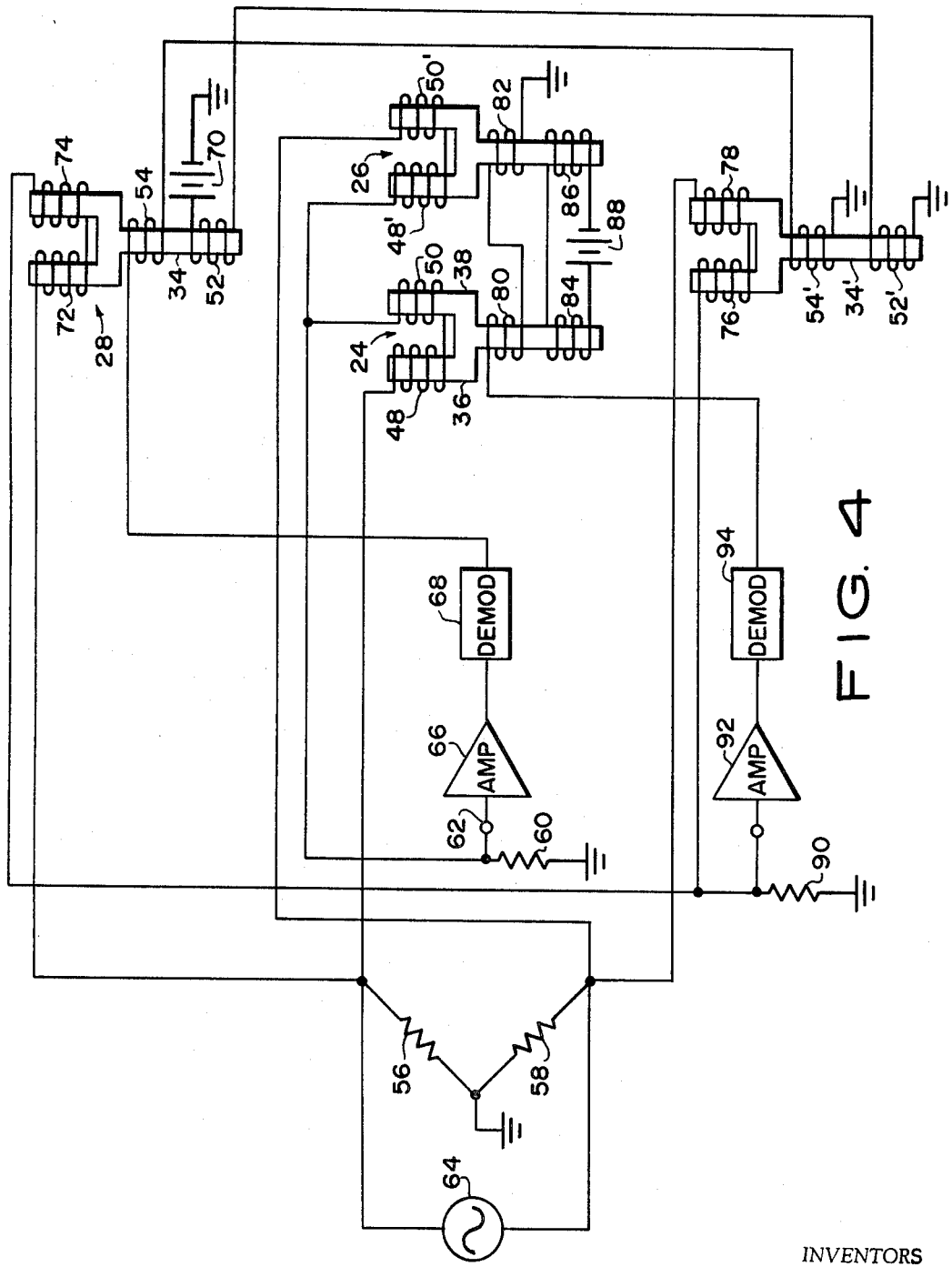

United States Patent Office 3,475,971
Patented Nov. 4, 1969

3,475,971
COMBINATION TWO-AXIS ELECTROMAGNETIC
TORQUE AND PICKOFF
Herbert Binder, New Monmouth, and Robert V. Delaney,
Convent Station, N.J., assignors to Singer-General Precision, Inc., Little Falls, N.J., a corporation of Delaware
Filed Apr. 28, 1967, Ser. No. 634,688
Int. Cl. G01c 19/28
U.S. Cl. 74—5.6
6 Claims

ABSTRACT OF THE DISCLOSURE

Sensing of the orientation of a gyroscope rotor and torquing of the same to re-establish a predetermined orientation is accomplished by four sensing and torquing devices arranged in two pairs. The devices are equidistantly, axially spaced from a gyroscope rotor in an initial position thereof and are symmetrically spaced about the rotor axis. The devices each comprise a core having a main body bifurcated or forked at one end, with a sensing winding on each of the fork arms and torquing windings on the main core body. The sensing windings are connected in a bridge circuit whereby the condition wherein the rotor becomes spaced closer to one of the devices than to any of the others causes a change in magnetic permanence of the magnetic circuit coupling the core and consequently an electrical unbalance in the bridge circuit, indicating tilt of the rotor from its initial position. For re-establishing the orientation of the rotor, the appropriate pair of opposed torquing windings are energized.

BACKGROUND OF THE INVENTION

This invention relates to gyroscopes and more particularly to the sensing of angular position of a gyroscope rotor relative to its supporting structure and to torquing to maintain the rotor in a predetermined angular position relative to such structure.

For effectively utilizing information provided by a gyroscope, it is necessary to sense the changes in position of the gyroscope rotor relative to its surroundings inasmuch as such change is indicative of the change in orientation of the vehicle to which the gyroscope housing as a whole, is secured. For maximum accuracy of the gyroscope, it is important that any sensor for determining such changes in relative position, in itself does not apply any significant torque or other influences upon the rotor. Effective sensors which avoid physical contact with a gyroscope rotor have been implemented by means establishing a magnetic path, a portion of which is through the gyroscope rotor or a member rotatable with it. Changes in relative rotor position affect the magnetic path in such a way as to be detectable to detect the rotor orientation.

In determining the magnitude of deflection or orientation of a gyroscope rotor relative to its surroundings, a procedure called "torquing," has been found very effective. In torquing, after a change in relative positions of rotor and its surroundings occurs, a force is appropriately applied to the rotor, in such direction and magnitude as to restore the rotor to its original relative position. In doing so, a measure of the direction of the restoring force and its magnitude yields a measure of the original change in orientation.

For maximum accuracy in torquing, it is preferable that such torquing be accomplished without physical contact with the rotor and without resisting the spin motion of the rotor or influencing it other than in applying a rotor restoring force. In such cases, there is no physical contact with the gyroscope rotor and the adverse influences on the gyroscope rotor are a minimum.

In accordance with various prior art arrangements, the incorporation of both magnetic sensing and magnetic torquing in the same gyroscope has been effected with some success. However, heretofore, each of these functions has been accomplished with separate and distinct means inasmuch as isolation of the separate magnetic circuits was deemed necessary to prevent one magnetic circuit from interferring with the other. In the environments in which gyroscopes are often utilized, such as missiles, space vehicles, and the like, it is desirable that the various vehicle components be compact and light in weight. Thus, the apparatus with separate magnetic circuits described, leave something to be desired in the construction of sensing and torquing means for gyroscopes.

Accordingly, it is a principal object of this invention to facilitate the magnetic sensing of gyroscope rotor position and the torquing of the same to restore its orientation by simple, effective unitary means that is light and relatively inexpensive.

SUMMARY OF THE INVENTION

Both the sensing of tilt of a gyroscope rotor and the torquing of the rotor to reorient the same to null position are effected by a plurality of co-operative composite sensing and torquing devices. The devices are mounted in a ferromagnetic and are equidistantly axially spaced from a ferromagnetic rotor or from a ferromagnetic ring on the rotor. The devices are symmetrically disposed; being equidistantly spaced from the the rotor spin axis and at equal circumferential intervals.

Each composite device includes a magnetic core having a main body with a bifurcation at one end terminating in a pair of pole faces. The main body portion of each device is mounted on the housing for good magnetic coupling thereto and each of the pole faces is placed in proximity to the magnetic portion of the rotor for good magnetic coupling thereto through gaps between the magnetic portion of the rotor and the pole faces. A pair of electrical windings in the form of an excitation winding and a control winding are coupled to the main body of each sensor and a winding is coupled to each bifurcation.

The bifurcated core portions, a portion of the rotor between projections of the faces of these portions and the gaps between the faces and rotor form a closed sensing magnetic circuit. The magnetic circuit for torquing includes the main body portion of one of the devices, the bifurcated arms of this device, in parallel; the gaps between the pole faces of the bifurcations and the rotor or magnetic member thereon, the portion of the rotor between the subject device and each of two circumferentially spaced devices (the flux dividing substantially equally in the two paths at this point), the gaps between the rotor and each of the sets of bifurcations at such adjacent devices, the bifurcations and main body portions of such adjacent devices and the magnetic housing to return to the subject composite device.

For sensing tilt of the gyroscope rotor, the pairs of windings on the bifurcations of a diametrically opposed pair of devices are made separate legs of an electrical bridge circuit. Rotor tilt which differentially alters the gaps between rotor and respective devices produces a change in magnetic permeance in the magnetic circuits of the bifurcations causing an unbalance in the bridge circuit and producing an output potential. For torquing, a signal derived from such a potential is applied to the serially connected control windings of a pair of opposed devices. These windings in response to currents resulting from such signals, each produce a magnetic field which, in one case, is additive with the field of the excitation winding and in the other case is opposed to the field of excitation winding. The differential magnetic fields so produced cause a differential attraction of the rotor to restore its nontilted orientation.

A BRIEF DESCRIPTION OF THE DRAWING

FIGURE 4 is an electrical circuit diagram (such as is used in a two-axis gyroscope) showing the interconnection of sensing and torquing windings of a pair of devices together with other appropriate circuitry for facilitating sensing and torquing of the gyroscope rotor.

DESCRIPTION OF THE PREFERRED EMBODIMENT

Figure 1:
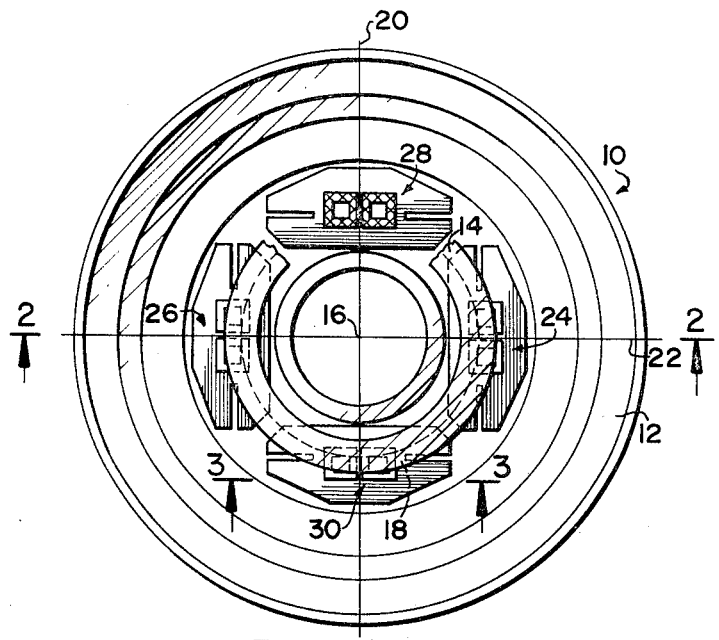
FIGURE 1 is an end-view of a gyroscope incorporating the present invention.
Figure 2:
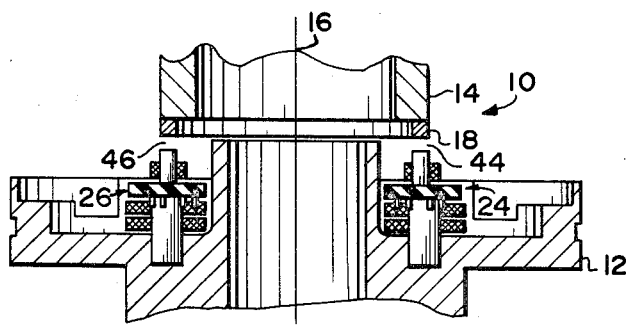
FIGURE 2 is a view taken along section 2—2 of FIGURE 1.

Referring now to the drawing for a detailed description, in FIGURES 1 and 2, 10 represents generally a gyroscope incorporating this invention and having a housing 12 which may be made of various suitable ferromagnetic materials such as iron or steel and, as seen more clearly in FIGURE 2 of the drawing, a rotor 14 is provided for rotation about a spin axis 16. The rotor 14 may be driven by a suitable means such as an electric motor, not shown. The rotor 14 may be made of various magnetic materials or of a nonmagnetic material with an annular magnetic member or ring 18 secured to one end of the rotor and rotatable with the rotor.

The housing 12 may be secured to a vehicle or other structure, the orientation of which is to be sensed and in the operation of the gyroscope 10, the rotor 14 may become tilted relative to an initial or null position with respect to the housing 12 as shown in FIGURES 1 and 2. Such tilt may be determined by the component tilt of the rotor about each of the axes 20 and 22 shown in FIGURE 1, and which are mutually perpendicular and both of which are perpendicular to the spin axis 16.

In accordance with a feature of this invention, for sensing the tilt of rotor 14 about axes 20 and 22 and for torquing, that is, for applying a restoring torque to the rotor 14 to reorient it to its null position, pairs of composite sensing and torquing devices 24–26 and 28–30 are secured to the housing 12 as shown more clearly in FIGURE 2 of the drawing and are positioned so that in the null position of rotor 14 the devices are equidistantly axially spaced from the rotor. Also each device of each pair is symmetrically positioned with respect to the other device of the pair. That is, devices 24 and 26 are equidistantly spaced from axis 16 and each of the devices lies on the axis 22. Similarly, devices 28 and 30 are equidistantly spaced from axis 16 and both are along the axis 20.

Figure 3:
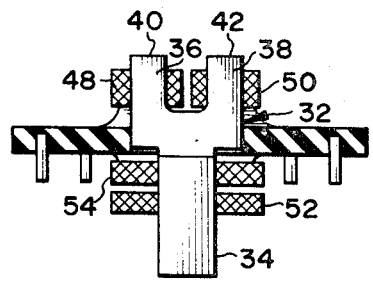
FIGURE 3 is a view taken along section 3—3 of FIGURE 1 and showing the details of the composite sensor and torquing device of this invention.

Referring now to FIGURE 3 of the drawing as well as to FIGURES 1 and 2, each of the devices 24–30 comprises a magnetic core 32 having a main body portion 34 bifurcated at one end to form a pair of arms 36 and 38. Each core 32 may be a solid piece of steel or a plurality of laminations held securely together in some suitable manner. The arms 36 and 38 are terminated in substantially flat pole faces designated 40 and 42, respectively.

Each of the devices 24 through 30 is mounted for good magnetic coupling to the housing 12 and as shown most clearly in FIGURE 2 may have the main body portion 34 thereof embedded in the housing. In such positions, the pole faces such as 40 and 42 form respective air gaps 44 and 46 between the annular ring 18 and the respective sets of pole faces. From the foregoing, it is clear that in response to tilt of the rotor 14 about one of the axes 20 or 22, the rotor and therefore the annular ring 18 become differentially spaced from devices on the opposite sides of such axis. For example, in response to tilt of the rotor about the axis 20, the spacing between the annular ring 18 and the devices 24 and 26 is differentially changed. The rotor and ring 18 become more closely spaced to one of the devices and further spaced from the other thereof.

In the gyroscope 10 as thus far described, a pair of magnetic circuits exists with respect to each composite device. One circuit is effective for sensing the tilt of the rotor 14 and the other for torquing, that is, reorienting the rotor to its null position. The sensing magnetic circuit includes the arms such as 36 and 38 of one of the composite devices, the air gaps 44 and 46 between pole faces such as 40 and 42 and the ring 18, and that portion of the ring instantaneously between the projections of pole faces such as 42 and 40 on the ring 18. The torquing magnetic circuit includes the main body portion of the core of a composite device such as 34, the two arms of such device such as 36 and 38, the gaps 44 and 46 between pole faces such as 40 and 42 and the annular ring 18, those oppositely circumferentially extending portions of the ring 18 instantaneously between the projections of pole faces such as 40 and 42 and the next circumferentially adjacent devices, the air gaps between such adjacent devices and the pole faces of the arms of the core of the next adjacent composite devices, the main body portion corresponding to the main body portion 34 of such next adjacent composite devices, and the ferromagnetic housing 12 of the gyroscope.

For facilitating the sensing of rotor tilt about either of the axes 20 and 22, the arms of the composite devices, corresponding to arms 36 and 38 of one of the composite devices are each provided with electrical windings such as 48 and 50 wound on the arms. Alternatively, only one of the arms may have an electrical winding wound thereon. It is clear therefore that as the rotor 14 tilts about one of the axes 20 or 22 and the gaps 44 and 46 become differentially spaced, the magnetic permeance of the oppositely disposed sensor parts of the composite devices becomes differentially altered and thus, the impedances of windings 48 and 50 are correspondingly altered differentially with respect to windings 48′ and 50′.

To facilitate torquing of rotor 14, each of the composite devices such as shown in FIGURE 3 of the drawings is also provided with a excitation winding 52 and a control winding 54 about the main body portion 34 of the core 32.

Referring now to FIGURE 4 of the drawing for more complete understanding of the invention, it is noted that the interrelationship between the sensor windings such as 48 and 50 of the devices along one axis and the excitation and control windings such as 52 and 54 of devices along an orthogonal axis, together with the electrical bridge circuitry useful for sensing the rotor tilt and torquing the rotor, is shown. In FIGURE 4, the composite devices 24 and 26 are reproduced and shown in greater schematic detail. It is observed that sensor windings 48 and 50 are serially connected with each other and these windings are also serially connected with corresponding windings 48′ and 50′ of composite device 26.

These sets of windings are also connected in parallel with a pair of resistors 56 and 58 forming an electrical bridge circuit wherein respective legs comprise windings 48 and 50, windings 48' and 50', resistor 56 and resistor 58. The junction between resistors 56 and 58 is grounded and the junction between the sets of windings of oppositely disposed sensor portions of a pair of composite devices, is connected through a load resistor 60 to ground. Accordingly, an output potential of the sensor portion of the circuit, whose magnitude and phase is dependent on rotor position, is derived and applied to an output terminal 62, connected to the ungrounded end of resistor 60, in response to appropriate electrical excitation applied across the resistors 56 and 58 by a suitable alternating potential source 64.

For torquing the rotor 14, or in other words, for re-establishing its null orientation, the output potential derived at terminal 62 is applied through an amplifier 66 to a demodulator circuit 58 to provide a direct potential signal whose amplitude and polarity are dependent on the amplitude and phase of the output potential at terminal 62. The output of this demodulator is applied to serially connected control windings 54 and 54' of the oppositely disposed devices 28 and 30. It should be particularly noted at this point that the same current flowing in the serially connected windings 54 and 54' produces oppositely directed electromotive forces and magnetic fluxes in the cores such as 34 and 34'.

Excitation windings 52 and 52' receive electrical excitation from a suitable direct current source such as shown at 70 which is grounded at one terminal and connected to winding 52 at its other terminal and it should again be noted that the same current in those serially connected windings produces magnetic flux lines in the same direction in the cores. Therefore, the magnetic flux lines produced by one of the control windings is in an additive sense with respect to the magnetic flux lines produced by the excitation winding on the same core and the magnetic flux lines produced by the control winding on the other of the cores is in an opposition sense with respect to the excitation winding on that core. Thus, it is clear that in response to tilt of the rotor about one axis results in the application of differential magnetic fields about an orthogonal axis resulting a torque about such orthogonal axis. By the nature of gyroscopes, such a torque results in a precession about the one axis to restore the rotor to its null position.

An entirely similar sensing and torquing action is provided by the pairs of sensing windings 72–74 and 76–78 together with torquing windings including control windings 80 and 82 and excitation windings 84 and 86. These windings and cores of devices are shown as associated and constructed in a manner entirely similar to the sensing and torquing windings described hereinabove and a source of direct potential 88 is provided for energizing windings 84 and 86. Also, additional circuitry including load resistor 90, amplifier 92 and demodulator 94, which are analagous, respectively, to resistor 60, amplifier 66 and demodulator 68, are provided and co-operate with sensing windings, torquing windings, and the bridge circuit in the manner explained hereinabove with respect to their counterparts. Thus, tilt about axis 22 may also be sensed and orientation of the gyroscope rotor restored. Therefore, any tilt about either axis individually or any composite tilt about both axes 20 and 22 simultaneously, may be sensed and orientation of the rotor restored by the action of one or both pairs of devices in a manner similar to that described above.

From the foregoing description, it is seen that in accordance with this invention the position sensing and torquing of a gyroscope rotor may be effected by the novel composite sensing and torquing devices such as 24, wherein separate magnetic circuits utilize common portions of the device. The necessity for separate entities for performing the individual sensing and torquing functions is obviated rendering the gyroscope as a whole, more compact.

It should be noted that the devices in addition to the construction described may also incorporate electrical trim windings which could be wound on the cores of the devices and appropriately electrically energized to provide desired initial conditions. As an example, such trim windings may be initially energized to establish more precise orthogonality of axes or to establish a more precise null position of the rotor 14.

What is claimed is:

1. A gyroscope including a ferromagnetic housing portion and a rotor having a magnetic portion and a spin axis, means for sensing tilt of said rotor relative to said housing and for torquing said rotor to re-establish a predetermined orientation thereof, said means including a plurality of devices each having a bifurcated, magnetic core, the ends of said bifurcations being equidistantly, axially spaced from said rotor in an initial position thereof and each bifurcation having an electrical winding coupled thereto, said rotor being tiltable about axes mutually perpendicular and perpendicular to said spin axis to vary the spacing between said rotor and each of a pair of said devices, the nonbifurcated portions of each of said cores having a pair of separately energizable electrical windings coupled thereto and being magnetically coupled to said housing, said windings of said bifurcated portions being connected in an electrical bridge circuit responsive to electrical excitation to produce an electrical signal indicative of the tilt of said rotor from said initial position, about one of said axes to energize the respective pairs of windings on the cores of said devices along the other of said axes to cause precession of said core and reorientation thereof to said initial position.

2. Rotor tilt sensing and torquing apparatus for a gyroscope having a magnetic housing portion and a rotor with a magnetic portion tiltable about each of mutually perpendicular axes perpendicular to the spin axis of the rotor, said apparatus comprising composite sensing and torquing devices each including a core with a body portion mounted on said housing and being bifurcated at one end, a pair of differential electrical windings coupling each of said body portions and an electrical winding coupling each of said bifurcations, electrical circuit means including said windings coupling said bifurcations for sensing the tilt of said rotor and means responsive to tilt of said rotor for energizing said differential windings on a pair of said body portions to reorient said rotor to a nontilt position.

3. A sensing and torquing device for use with a gyroscope having a magnetizable housing and a magnetizable rotor, said device including a magnetic core mountable in said housing and being bifurcated at one end, first electrical winding means coupling said bifurcated portion and second electrical windings means coupling the nonbifurcated portion of said core, said second electrical winding means comprising a pair of windings separately energizable.

4. A sensing and torquing device according to claim 3 wherein said first electrical winding means comprises a separate electrical winding on each of said bifurcations.

5. A rotor tilt sensing torquing circuit for use with a gyroscope having a spin axis, a magnetic rotor portion and a magnetic housing portion comprising first and second pairs of composite sensing and torquing devices each having a magnetic core with a main body portion bifurcated at one end to form a pair of arms, a sensing winding coupled to an arm of each of said devices, an excitation winding and, a control winding coupling the main body portion of the core of each device, means for detecting the change in magnetic permeance of the magnetic circuit coupling the arms of each pair of devices to provide an electrical signal indicative of such change and means coupled to said detecting means and being responsive to energize the control windings of the other pair of devices whereby the disposition of said devices along mutually perpendicular axes both perpendicular to said spin axis and magnetically coupled to the magnetic portions of said housing and rotor is effective to sense tilt of the rotor and to apply a torque thereto to restore its position to untilted position.

6. A circuit according to claim 5 wherein said detecting means comprises an electrical bridge circuit having the sensing winding of each of said devices in a branch thereof.

References Cited

UNITED STATES PATENTS

| | | | |
|---|---|---|---|
| 3,107,540 | 10/1963 | Curriston | 74—5.6 XR |
| 3,252,340 | 5/1966 | Watt | 74—5.6 |
| 3,323,377 | 6/1967 | Fraiser et al. | 74—5.6 |
| 3,354,726 | 11/1967 | Krupick et al. | 74—5.6 |

MILTON KAUFMAN, Primary Examiner

M. ANTONAKAS, Assistant Examiner